US010691234B2

(12) United States Patent
Yuan (10) Patent No.: US 10,691,234 B2
(45) Date of Patent: Jun. 23, 2020

(54) RECEIVING INPUT FROM MULTIPLE TOUCH SENSORS

(71) Applicants: INTEL CORPORATION, Santa Clara, CA (US); Kaining Yuan, Shanghai (CN)

(72) Inventor: Kaining Yuan, Shanghai (CN)

(73) Assignee: Intel Corporation, Santa Clara, CA (US)

(*) Notice: Subject to any disclaimer, the term of this patent is extended or adjusted under 35 U.S.C. 154(b) by 2099 days.

(21) Appl. No.: 13/976,807

(22) PCT Filed: Dec. 17, 2012

(86) PCT No.: PCT/CN2012/086761
§ 371 (c)(1),
(2) Date: Jun. 27, 2013

(87) PCT Pub. No.: WO2014/094205
PCT Pub. Date: Jun. 26, 2014

(65) Prior Publication Data
US 2019/0196628 A1    Jun. 27, 2019

(51) Int. Cl.
*G06F 3/045* (2006.01)
*G06F 3/041* (2006.01)
(Continued)

(52) U.S. Cl.
CPC ............ *G06F 3/0412* (2013.01); *G06F 1/163* (2013.01); *G06F 1/169* (2013.01); *G06F 1/1626* (2013.01);
(Continued)

(58) Field of Classification Search
CPC ...... G06F 3/0412; G06F 3/017; G06F 3/0488; G06F 3/041; G06F 3/044
See application file for complete search history.

(56) References Cited

U.S. PATENT DOCUMENTS 8,049,732 B2 * 11/2011 Hotelling ............... G06F 3/044
345/173
8,116,824 B2 * 2/2012 Choi ..................... G06F 1/1616
345/173
(Continued)

FOREIGN PATENT DOCUMENTS

CN   101442570 A   5/2009
CN   101512461 A   8/2009
(Continued)

OTHER PUBLICATIONS

International Search Report and Written Opinion received for PCT Patent Application No. PCT/CN2012/086761, dated Sep. 19, 2013, 10 pages.

*Primary Examiner* — Vijay Shankar
(74) *Attorney, Agent, or Firm* — International IP Law Group, P.L.L.C.

(57) ABSTRACT

A method for receiving inputs from touch panels is described. The method may include checking for a first input from a first touch panel of a computing device. The method may also include checking for a second input from a second touch panel of the computing device; wherein the first and second inputs are related to a gesture. The method may also include receiving the first and second input simultaneously. The method may also include performing an operation at the computing device based on the simultaneous input from the first touch panel and the second touch panel.

22 Claims, 10 Drawing Sheets (51) Int. Cl.
*G06F 1/16* (2006.01)
*G06F 3/0488* (2013.01)
*G06F 3/01* (2006.01)

(52) U.S. Cl.
CPC ............ *G06F 1/1692* (2013.01); *G06F 3/017* (2013.01); *G06F 3/0488* (2013.01); *G06F 3/04883* (2013.01); *G06F 2203/04808* (2013.01)

(56) References Cited

U.S. PATENT DOCUMENTS

| | | | | |
|---|---|---|---|---|
| 8,471,822 | B2* | 6/2013 | Lightenberg | G06F 1/1616 |
| | | | | 345/173 |
| 8,539,384 | B2* | 9/2013 | Hinckley | G06F 3/04883 |
| | | | | 715/863 |
| 8,823,656 | B2* | 9/2014 | Simmons | G06F 1/1641 |
| | | | | 345/1.1 |
| 8,866,754 | B2* | 10/2014 | Homma | G06F 3/0416 |
| | | | | 345/1.1 |
| 9,110,564 | B2* | 8/2015 | Hwang | G06F 3/04817 |
| 2009/0131117 | A1* | 5/2009 | Choi | G06F 1/1616 |
| | | | | 455/566 |

FOREIGN PATENT DOCUMENTS

| | | |
|---|---|---|
| CN | 101719032 A | 6/2010 |
| CN | 102541432 A | 7/2012 |

* cited by examiner

RECEIVING INPUT FROM MULTIPLE TOUCH SENSORS

TECHNICAL FIELD

This disclosure relates generally to methods and systems of receiving input from two touch sensors of a computing device. More specifically, the techniques disclosed relate to receiving input from two touch sensors simultaneously.

BACKGROUND ART

Computing devices may include touch switches or touch sensors. For example, computing devices including mobile phones, smartphones, tablet computers, laptop computers, and the like may include a touch panel configured to interact with a user of the computing device. In some embodiments, touch panels facilitate interaction with a graphical user interface of a computing device. In the case of touch panels implemented as a touch screen, the user may interact directly with what is displayed on the graphical user interface, rather than indirectly with a pointer controlled by a mouse. In the case of a touch panel, such as a touch pad, a user does not directly interact with a graphical user interface, but instead interacts with a touch panel that may indirectly interact with the graphical user interface.

The same numbers are used throughout the disclosure and the figures to reference like components and features. Numbers in the 101 series refer to features originally found in FIG. 1; numbers in the 200 series refer to features originally found in FIG. 2; and so on.

DESCRIPTION OF THE EMBODIMENTS

The present disclosure relates generally to techniques operations on a computing device. The computing device may include two touch panels. The computing device may receive a first input from a first touch panel and a second input from the second touch panel. The operations are performed upon receiving the first and second inputs simultaneously. For example, the computing device may be a smartphone with a touch panel on the display of the smartphone and a touch panel on the back of the smartphone. When the smartphone receives an input from both the front touch panel and the second touch panel simultaneously, the smartphone may perform a gesture operation based on the first and second inputs being simultaneously received.

A touchscreen may include an array of touch sensors on at a display. In contrast, a touch panel may include an array of sensors, but may not be required to be at a display. The term "touch panel," as used herein, is an array of touch sensors either disposed at a touchscreen or without a touchscreen.

The term "touch sensor," as referred to herein, is a type of switch that nay operate by being touched by an object such as a finger. In some embodiments, the touch sensor may operate without being touched, but by sensing an electric field of an object nearby. In these embodiments, the touch sensor may sense an object, such as a finger, that is hovering near the touch sensor, rather than touching the sensor physically. A touch sensor may include a capacitance touch sensor comprising an electrode configured to interface with an electric field of an object, such as a finger for example. A touch sensor may also include a resistance touch sensor which may include at least two electrodes interfacing with an object, such as a finger. As used herein, a touch sensor is used to report a location of the touch to a computing device. The location may be used to determine either a fixed touch location or a touch that is moving across the surface, e.g. a "gesture", as used herein.

Figure 1:
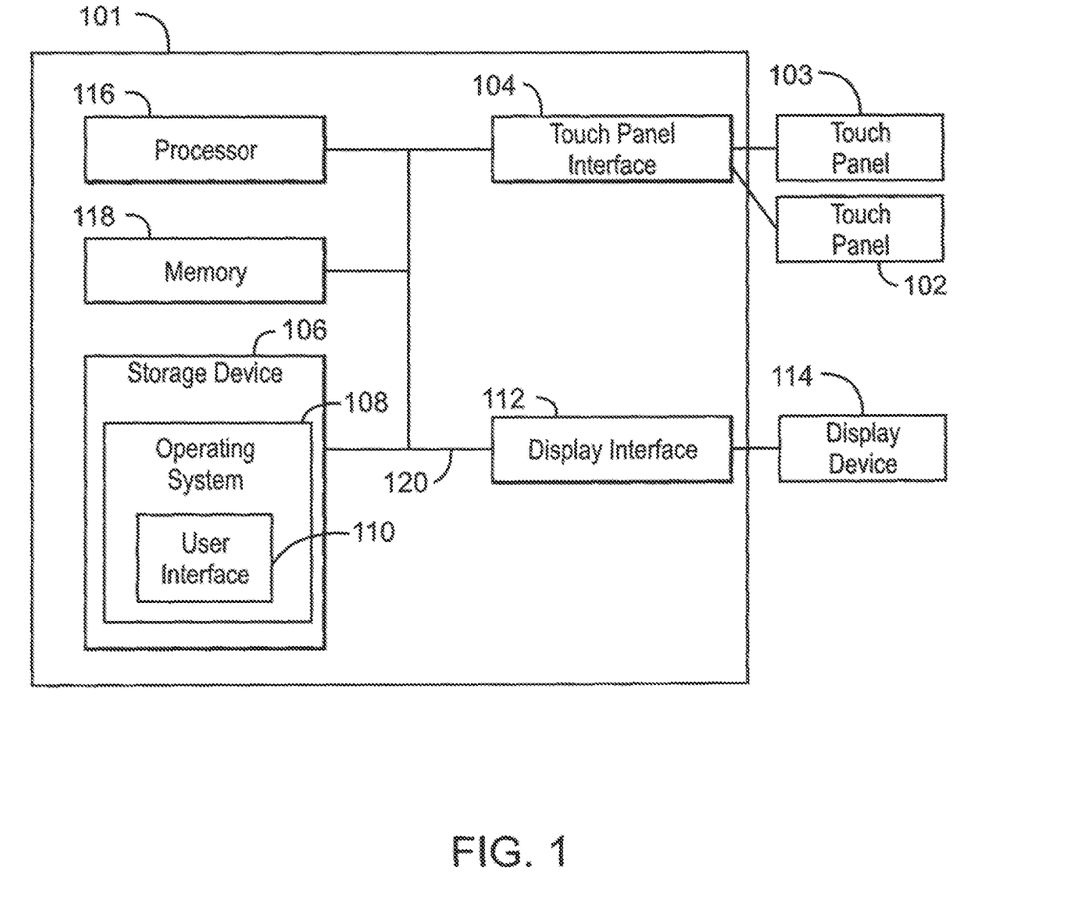
FIG. 1 is a block diagram illustrating a system including a computing device with two touch panels.

FIG. 1 is a block diagram illustrating a system 100 including a computing device 101 with two touch panels. A first touch panel 102 may be configured to receive a first input, and a second touch panel 103 may be configured to receive a second input. The first and second inputs can include touches or gestures. For example, a gesture may include swiping a finger across the touch panel (either the first touch panel 102, or the second touch panel 103), touching and holding the finger on the touch panel, sliding a first finger in one direction on the first touch panel 102 while a second finger slides in the opposite direction on the second touch panel 103, a number of any of the foregoing gestures, or any combination thereof.

In an embodiment, both the first touch panel 102 and the second touch panel 103 may be a capacitance touch panel. In an embodiment, the first touch panel 102 may be a capacitance touch panel and the second touch panel 103 may be a resistance touch panel. It is important to note that embodiments including other combinations of capacitance and resistance touch panels are contemplated and any specific embodiment may vary.

The computing device 101 may be, for example, a laptop computer, desktop computer, tablet computer, mobile device, server, or cellular phone, a wearable computing device, among others. The computing device 101 may also include a processor 116 and a storage device 106, comprising a non-transitory computer-readable medium. The storage device 106 may have instructions stored thereon that when executed by the processor 116 cause the computing device 101 to perform operations. The operations may include checking for the first input from the first touch panel 102 and checking for the second input from the second touch panel 103. The operations may also include receiving the first and second input simultaneously. The operations may also include performing an operation at the computing device 101 when the simultaneous input is received. In some embodiments, the operations may be carried about by hardware logic. Hardware logic at least partially includes hardware, and may also include software, or firmware. Hardware logic may include electronic hardware including interconnected electronic components which perform analog or logic operations on received and locally stored information to produce as output or store resulting new information or to provide control for output actuator mechanisms. Electronic hardware may include individual chips/circuits and distributed information processing systems.

The processor 116 may be a main processor that is adapted to execute stored instructions, as well as a memory device 118 that stores instructions that are executable by the main processor 116. The main processor 116 can be a single core processor, a multi-core processor, a computing cluster, or any number of other configurations. The main processor 116 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 118 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. In an embodiment, the instructions stored in the storage device 106 are stored in the memory device 118.

The main processor 116 may be connected through a system bus 120 (e.g., PCI, ISA, PCI-Express, HyperTransport®, NuBus, etc.) to the touch panel interface 104. The touch panel interface 104 may be adapted to connect the computing device 101 to the first touch panel 102 and the second touch panel 103. The main processor 202 may also be linked through the system bus 120 to a display interface 112. The display interface 112 may be adapted to connect the computing device 101 to a display device 114. The display device 114 may include a touch screen including the first touch panel 102, and the display device 114 may be a built-in component of the computing device 101. The display device 114 may also include a computer monitor, television, or projector, among others, that is externally connected to the computing device 101.

Figure 2A:
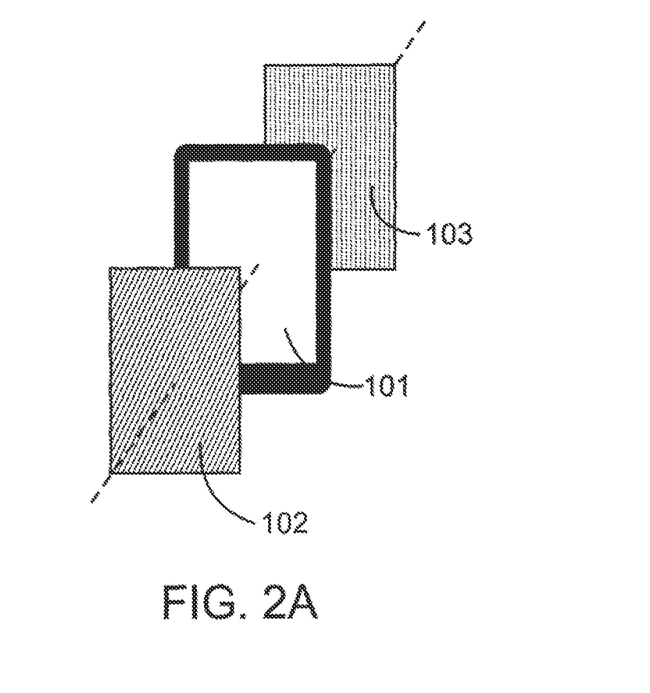
FIG. 2A is a drawing illustrating a handset with a first touch panel touch and a second touch panel.

FIG. 2A is a drawing illustrating a handset 201 with the first touch panel 102 and a second touch panel 103. The handset 201 may be a computing device such as the computing device 101 discussed above in reference to FIG. 1. As illustrated in FIG. 2, the first touch panel 102 may be disposed at the front side of the handset 201, and the second touch panel 103 may be disposed on the opposing, or back, side of the handset 201. The first touch panel 102 may be disposed at a display (not numbered), similar to the display device 114 described with respect to FIG. 1.

Figure 2B:
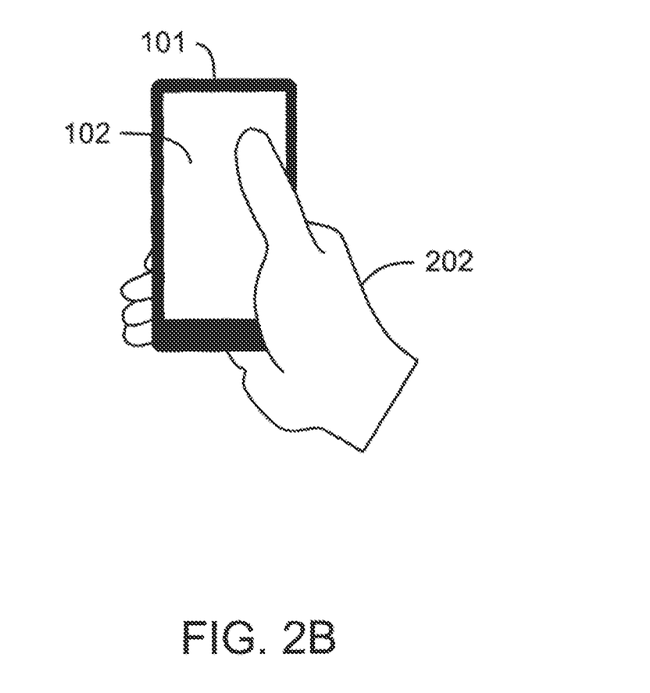
FIG. 2B is a drawing illustrating the handset being held by a user.

FIG. 2B is a drawing illustrating the handset 201 being held by a user 202. The first touch panel 102 may be configured to interact with objects such as fingers of the user 202 illustrated in FIG. 2B. Likewise, the second touch panel (not shown) may be configured to interact with objects such as the fingers of the hand 202 disposed near the back side of the handset 201.

Figure 2C:
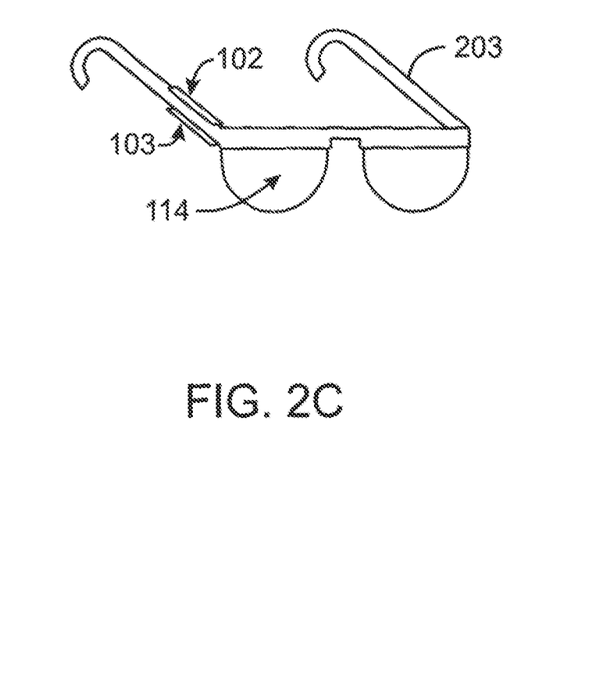
FIG. 2C is a drawing of a wearable computing device having a first touch panel and a second touch panel.

FIG. 2C is a drawing of a wearable computing device 203 having a first touch panel 102 and a second touch panel 103. The wearable computing device 203 may include a display device 114, such as lenses of the wearable computing device 203.

Figure 2D:
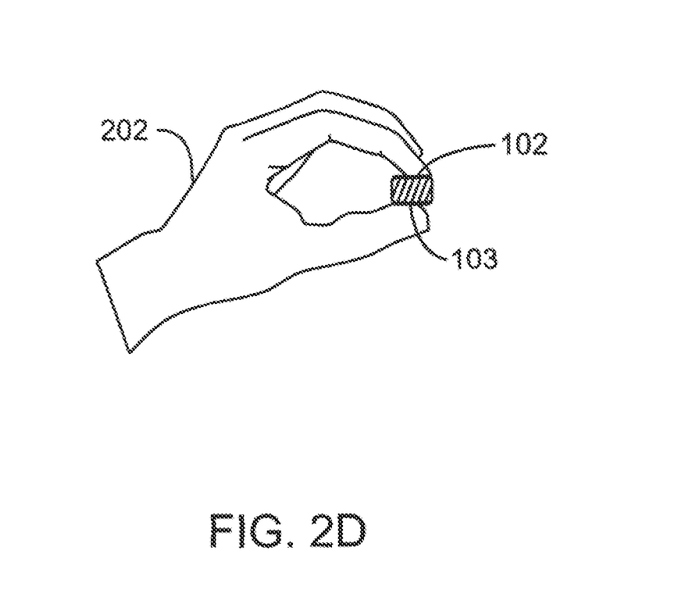
FIG. 2D is a cross-sectional view of the wearable computing device illustrating the touch panels of the wearable computing device being engaged by the user

FIG. 2D is a cross-sectional view of the wearable computing device 203 illustrating the touch panels 102, 103 of the wearable computing device 203 being operated by the hand 202 of a user. The first touch panel 102, for example, disposed near the top of the wearable computing device 203 may be configured to interact with objects such as fingers of the user 202 illustrated in FIG. 2D. Likewise, the second touch panel 103 may be configured to interact with objects such as the thumb of the hand 202 disposed near the bottom of the wearable computing device 203.

Figure 3:
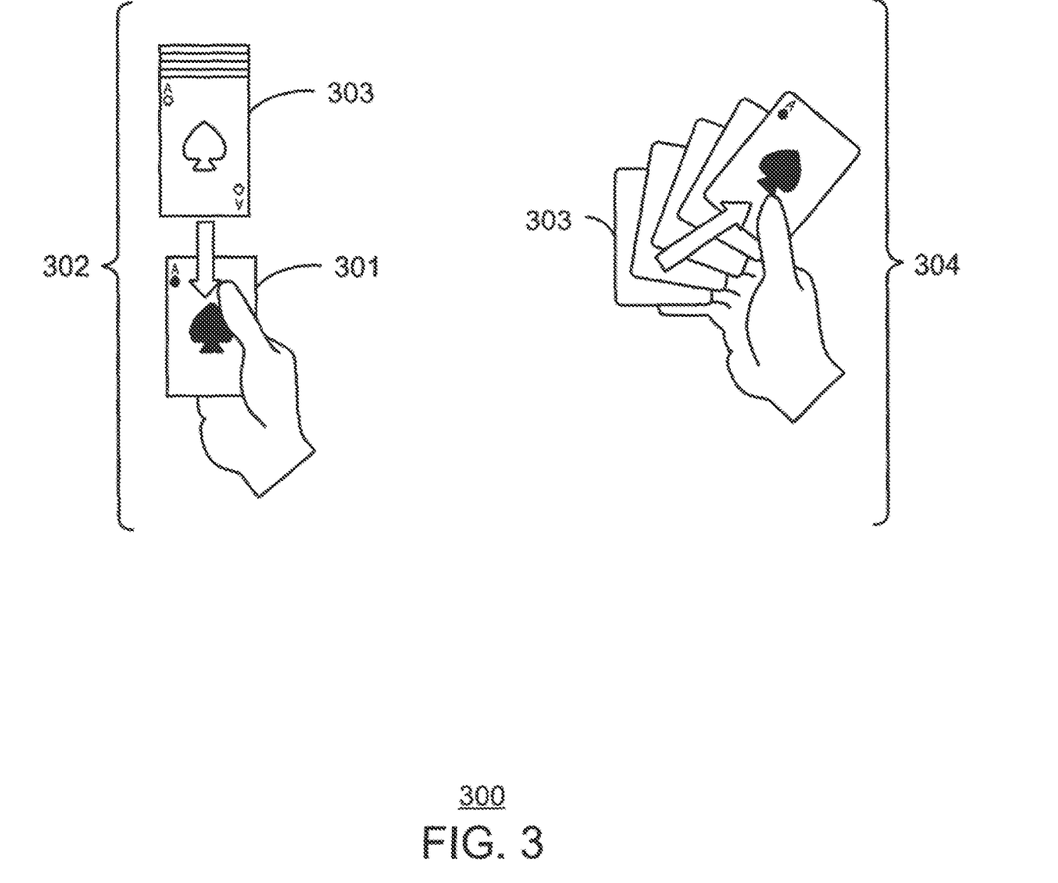
FIG. 3 is a diagram illustrating embodiments of operations that may be performed at the computing device.

FIG. 3 is a diagram illustrating embodiments of operations 302, 304 that may be performed at the computing device 101 described with respect to FIG. 1. An operation 302 may include withdrawing a card 301 from a deck of cards 303. Another operation 304 may include spreading the deck cards 303 apart. The operations 302, 304 are provided as examples, and other operations may be included as described below in reference to FIGS. 5A-5C.

Figure 4A:
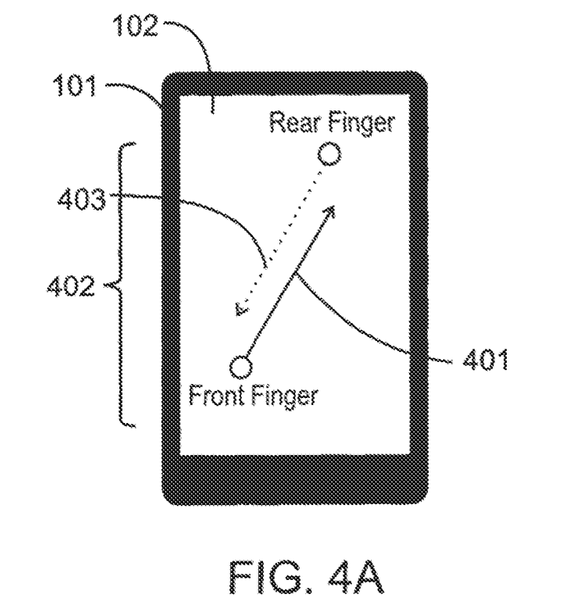
FIGS. 4A-4B are schematic drawings illustrating gestures that may be performed at the computing device, such as the handset described with respect to FIGS. 2A-2B.
Figure 4B:
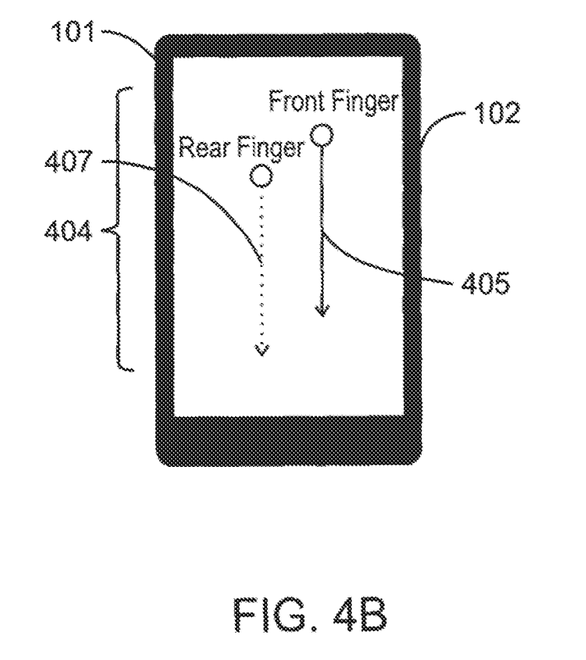

FIGS. 4A-4B are schematic drawings illustrating gestures 402, 404 that may be performed at the computing device 101, such as the handset 201 described with respect to FIGS. 2A-2B. The gesture 402 may include a first gesture 401 on the first touch panel 102 in a first direction and a second gesture 403 at the second touch panel (not shown) opposite in relation to the first direction. The gesture 404 may include a first gesture 405 at the first touch panel 102 in a first direction and a second gesture 407 at the second touch panel (not shown) in the first direction.

In some embodiments, the gestures may include other gestures not shown in FIGS. 4A-4B. For example, the gesture may include a first gesture at the first touch panel 102 comprising a touch and hold gesture and a second gesture at the second touch panel (not shown) comprising a touch and hold gesture. As another example, the gesture may include a first gesture at the first touch panel 102 comprising a touch and hold gesture and a second gesture at the second touch panel (not shown) in a first direction. As a further example, the gesture may include a first gesture at the first touch panel 102 in a first direction and a second gesture at the second touch panel (not shown) comprising a touch and hold gesture. The computing device 201 may receive the gesture including a simultaneous first and second input based on gestures of the at the first and second touch panels, and may perform operations based on the gestures.

Figure 5A:
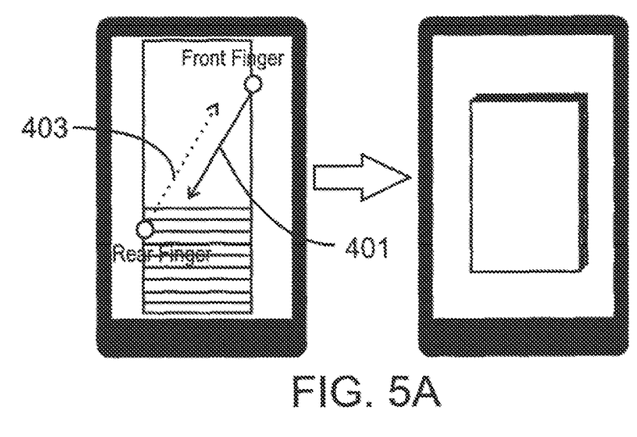
FIGS. 5A-5C are schematic drawings of operations that may be performed at the computing device.
Figure 5B:
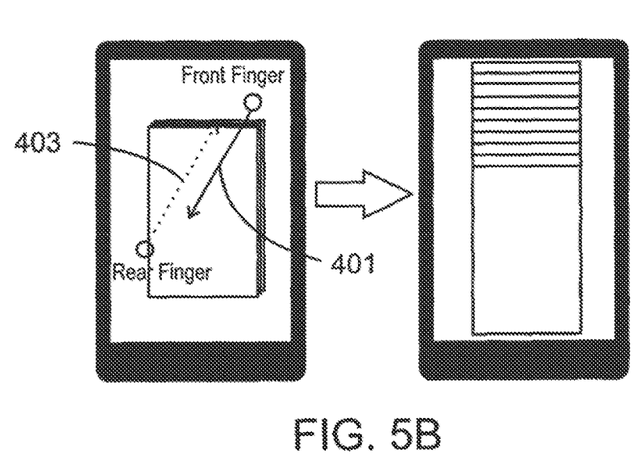
Figure 5C:
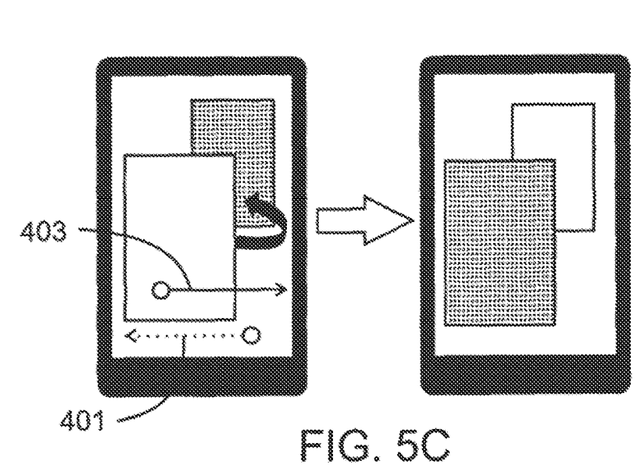

FIGS. 5A-5C are schematic drawings of operations that may be performed at the computing device 101. FIG. 5A illustrates that in response to the first gesture 401 and the second gesture 403, the operation may include stacking of one or more objects, such as a stack of cards, appearing spread out on the display of the computing device 101. As illustrated in FIG. 5B, the first gesture 401 and the second gesture 403 may also facilitate an operation including spreading of objects appearing stacked on one another on a display of the computing device 101. As illustrated in FIG. 5C, the first gesture 401 and the second gesture 403 may facilitate an operation that rotates the view of an object appearing on the display of the computing device from front to back. Alternatively or additionally, the first gesture 401 and the second gesture 403 may facilitate an operation including rotating through two or more objects appearing on the display of the computing device in a sequence from one object to another object. Other operations are contemplated. For example, the operations may also include manipulation of a three-dimensional object, such as a cube or a sphere, appearing on the display of the computing device. In some embodiments, the operations may include selecting an object and moving the object to a different location. For example, the operations may include selecting text from a document and moving it to a different location. As another example, the operations may include selecting a picture from a webpage and moving it to a virtual clipboard.

Figure 6A:
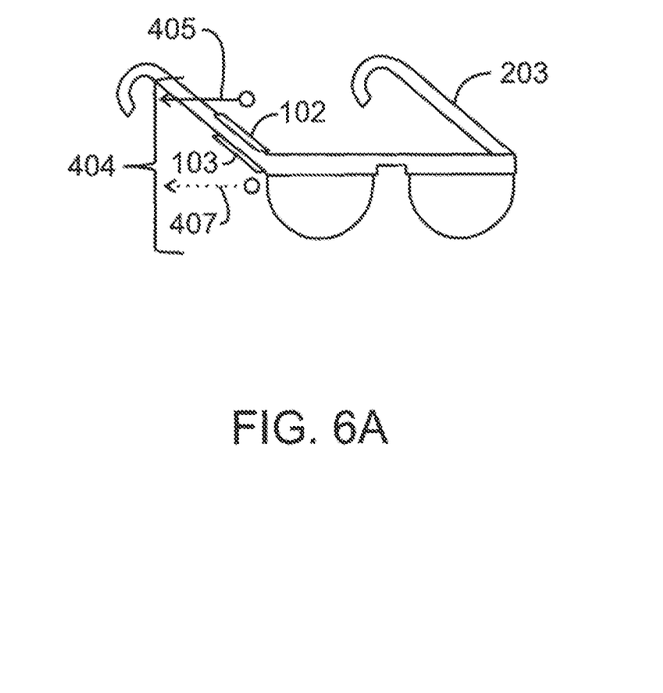
FIGS. 6A-6D are schematic drawings illustrating embodiments of gestures that may be performed at the a wearable computing device.
Figure 6B:
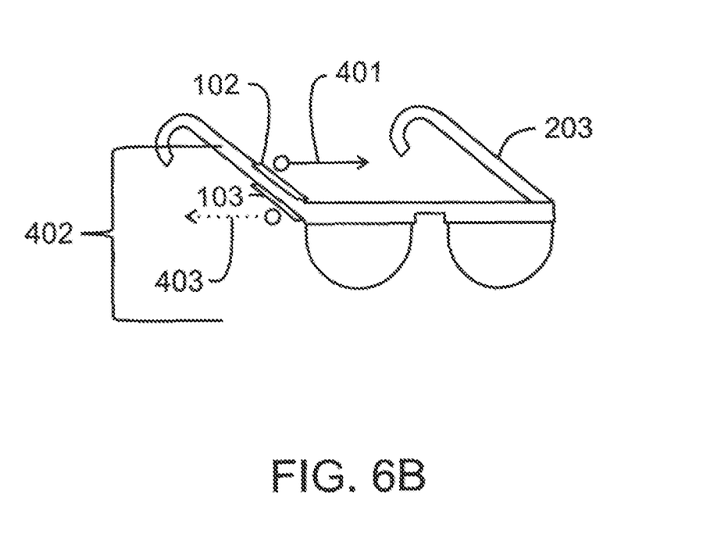
Figure 6C:
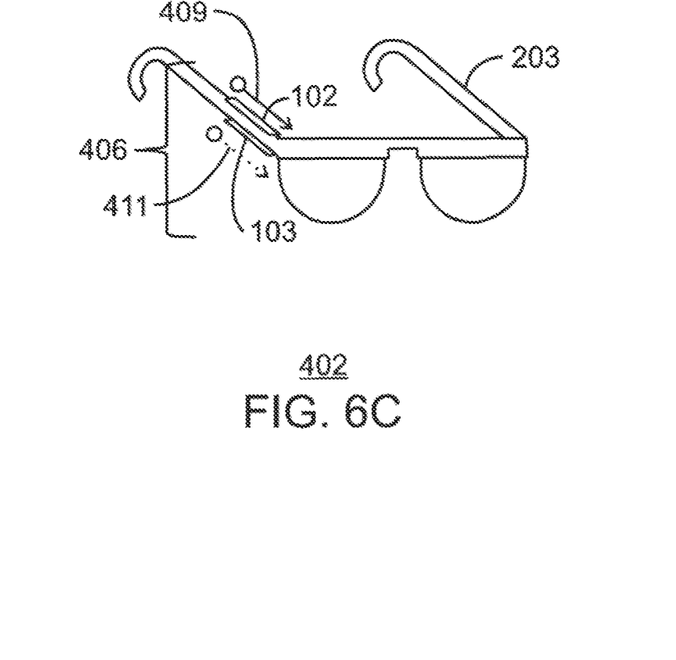
Figure 6D:
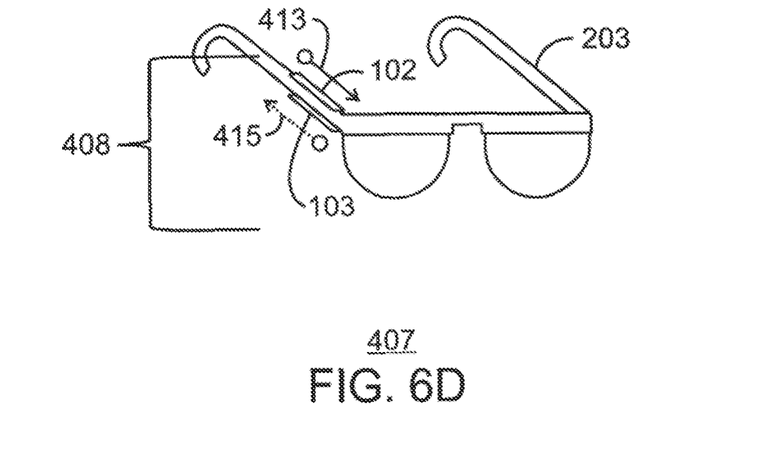

FIGS. 6A-6D are schematic drawings illustrating embodiments of gestures that may be performed at the wearable computing device 203 with respect to FIGS. 2C-2D. The touch panels 102, 103 may be disposed on the frame of the wearable computing device 203. The gesture 402 may include the first gesture 401 at the first touch panel 102 in a first direction and a second gesture 403 at the second touch panel 103 opposite in relation to the first direction. The gesture 404 may include a first gesture 405 at the first touch panel 102 in a first direction and a second gesture 407 at the second touch panel 103 in the first direction as illustrated in FIGS. 6A-6B. FIGS. 6C-6D are schematic drawings illustrating alternatively embodiments, of gestures that may be performed at the wearable computing device 203. In these embodiments, the gesture 409B may include the first gesture 409 at the first touch panel 102 in a first direction and a second gesture 411 at the second touch panel 103 in the first direction. As illustrated in FIG. 6D, the gesture 408 may include a first gesture 413 at the first touch panel 102 in a first direction and a second gesture 415 at the second touch panel 103 in a second direction opposite in relation to the first direction.

In an embodiment, the gestures may include other gestures not shown in FIGS. 6A-6B. For example, the gesture may include a first gesture at the first touch panel 102 comprising a touch and hold gesture and a second gesture at the second touch panel 103 comprising a touch and hold gesture. As another example, the gesture may include a first gesture at the first touch panel 102 comprising a touch and hold gesture and a second gesture at the second touch panel 103 in a first direction. As another example, the gesture may include a first gesture at the first touch panel 102 in a first direction and a second gesture at the second touch panel 103 comprising a touch and hold gesture.

Figure 7:
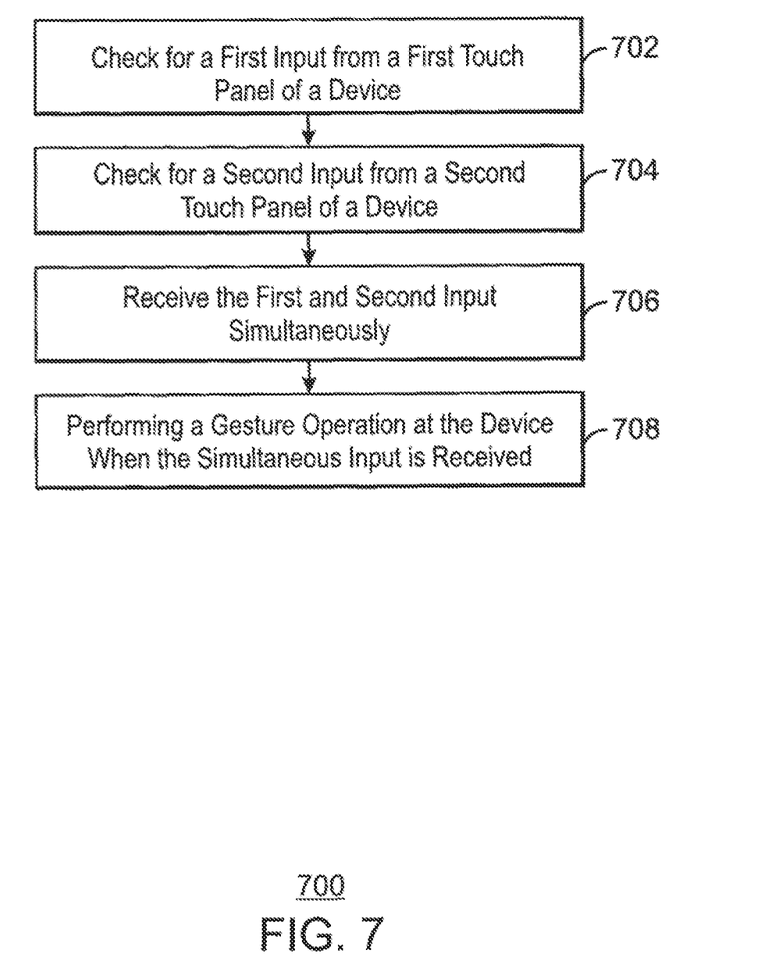
FIG. 7 illustrates a block diagram of a method for receiving inputs from touch panels of a computing device.

FIG. 7 illustrates a block diagram of a method 700 for receiving inputs from touch panels of a computing device. The method 700 may include checking, at block 702, for a first input from a first touch panel of a computing device. The method 700 may also include checking, at block 704, for a second input from a second touch panel of the computing device. The first and second inputs are related to a gesture at the first and second touch panel respectively. The method 700 may also include determining, at block 706, that the first and second input are substantially simultaneous, e.g., related. The method 700 may also include performing, at block 708, an operation at the computing device based on the simultaneous input from the first touch panel and the second touch panel.

The first and second inputs may include gestures of a user. Each gesture may further include a plurality of gestures. For example, the gestures may include a first gesture at the first touch panel in a first direction and a second gesture at the second touch panel in the first direction. The gestures may include a first gesture at the first touch panel in a first direction and a second gesture at the second touch panel in a second direction opposite in relation to the first direction. The gestures may include a first gesture at the first touch panel comprising a touch and hold gesture and a second gesture at the second touch panel comprising a touch and hold gesture. In an embodiment, the gestures may include a first gesture at the first touch panel comprising a touch and hold gesture and a second gesture at the second touch panel in a first direction. The gestures may include a first gesture at the first touch panel in a first direction and a second gesture at the second touch panel comprising a touch and hold gesture.

The operations performed may be operations performed on virtual object displayed on the computing device. The operations may include spreading of one or more objects appearing stacked on one another on a display of the computing device. The operations may include stacking of one or more objects appearing spread out on the display of the computing device. The operations may include rotating of one or more objects appearing on the display of the computing device from front to back. The operations may include rotating through two or more objects appearing on the display of the computing device in a sequence from one object to another object. The operations may include manipulation of a three-dimensional object appearing on the display of the computing device. The operations may include selecting an object and moving the object to a different location.

Figure 8:
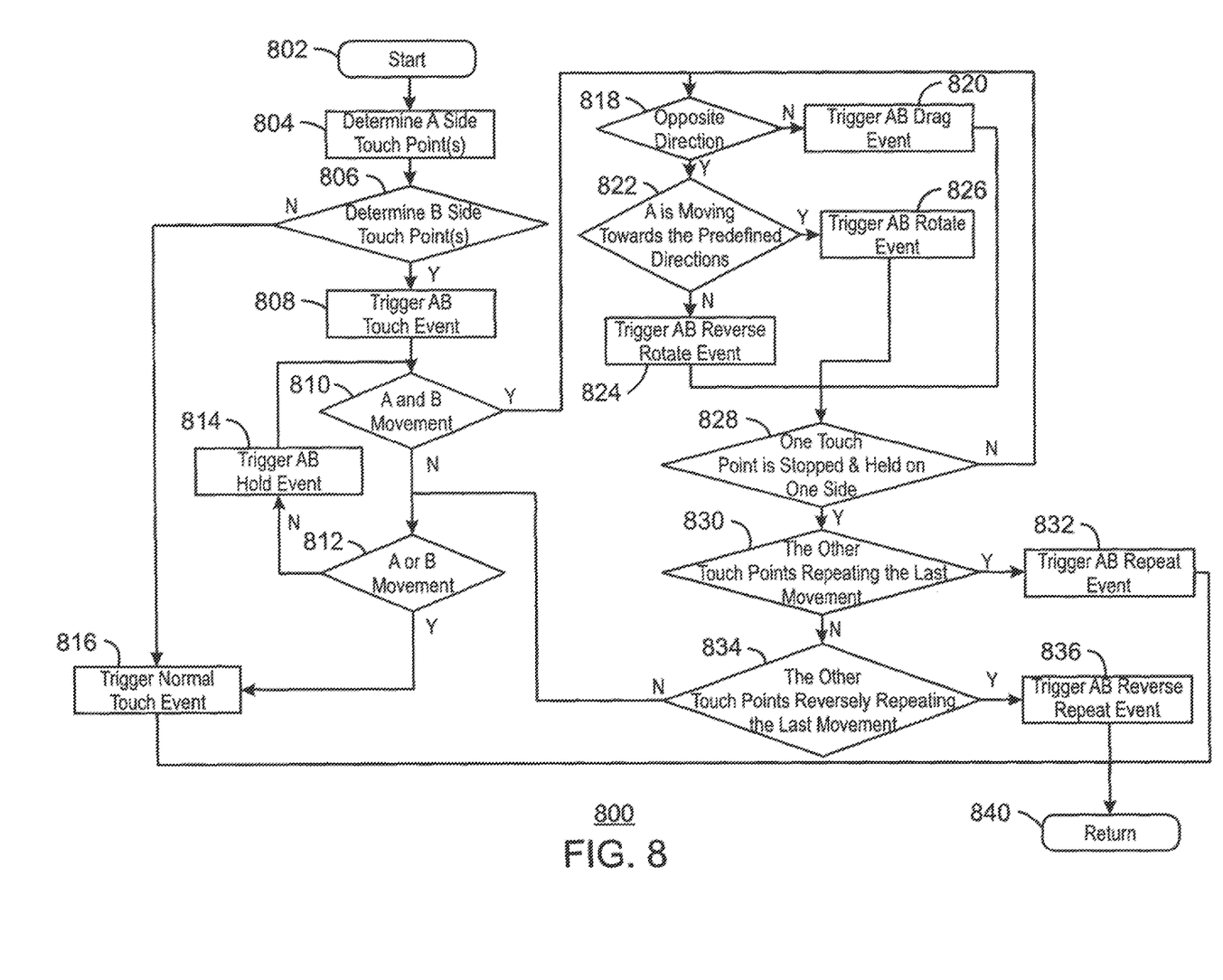
FIG. 8 is a process flow diagram illustrating a process receiving inputs from touch panels of a computing device.

FIG. 8 is a process flow diagram illustrating a process 800 for receiving inputs from touch panels of a computing device. In the flow diagram illustrated in FIG. 8, the first touch panel is referred to as "A side" and the second touch panel is referred to as "B side." In addition, a first input received at the first touch panel is referred to as an "A event." Likewise, a second input received at the second touch panel is referred to as a "B event." Further, simultaneously receiving a first and second input is referred to as an "AB event." After starting at block 802, the process flow may determine, at block 804, that an A event has occurred, and at block 806 determine that a B event has occurred. At block 808, an AB touch event is triggered when the A event and B event occur substantially simultaneously. As used herein, substantially simultaneously indicates that the gestures overlap in time sufficiently that the computing device interprets them as a single AB event. At block 810, a determination is made if there is both A side movement and B side movement. If not, then a determination is made at block 812 whether there is movement at either the A side or the B side. If there is no movement at either the A side or the B side, an AB hold event is triggered at block 814.

If, at block 810, a determination is made indicating movement at the A side and B side but not occurring substantially simultaneously, then a normal touch event may be triggered at block 816. Alternatively, if at block 810 a determination is made indicating movement substantially simultaneous at both the A side and B side the process flow will proceed to block 818 to determine if the movement at the A side is in an opposite direction of the movement at the B side.

If the movement is not in an opposite direction, process flow will proceed to block 820. At block 820, an AB drag event is triggered. An AB drag event may include spreading one or more objects appearing stacked on one another on a display of the computing device as discussed above in reference to FIGS. 5A-5B.

Alternatively, if it is determined at block 818 that the AB event was not in an opposite direction, a determination is made at block 822 as to whether the input at the A side is moving in a predefined direction and the input at the B side is moving in a predefined direction, for example, opposite to each other. The predefined direction may indicate an operation that the objects displayed on a screen are to be rotated in a first direction. If the movement at the A side and B side is not in the predefined direction, at block 824 an AB reverse rotation event is triggered.

If at block 822 the movement at the A side and the B side is determined to be in the predefined direction, at block 826, an AB rotate event is triggered. If the AB rotate event is triggered, a determination may be made at block 828 whether one of the movements, either the movement on the A side or the B side, is stopped and held. If neither side has stopped and held movement, the process flow may resume at block 810.

Alternatively, if at block 828 a determination is made that movement on one side has stopped and is being held in place, the process 800 may determine whether the other side is repeating the last movement. For example, the process 800 may trigger, at block 826, an AB rotate event by a movement at the A side in a first direction and a movement at the side B in a second direction opposite from the first direction. A determination may be made, at block 828, that the movement in the first direction at side A has stopped and is being held in place. Further, a determination may be made at block 830 that the movement in the second direction is being repeated at the B side. An AB repeat event is then triggered at block 832. The AB repeat event may include repeating of the rotation triggered at block 826, for example.

If at block 830 a determination is made that the B side movement is not repeating the last movement, then a determination is made at block 834 as to whether the movement at the B side is reversibly repeating the last movement. If the movement at the B side is not reversibly repeating the last movement, then the process flow may resume at block 812

Alternatively, if at block 834 a determination made indicating that the movement at the B side is reversibly repeating the least movement, an AB reverse repeat event may be triggered at block 836. For example, a determination may be made at block 834 that the movement at the B side is reversibly repeating the rotate event triggered at block 826 and a reverse rotation may of the objects displayed on the screen may be triggered at block 836.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases ay each nave a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, ail optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising;
   a first touch panel to receive a first input;
   a second touch panel to receive a second input;
   a processor;
   logic to check for the first input from the first touch panel of a computing device;
   logic to check for the second input from the second touch panel of the computing device;
   logic to determine if the first and second input occurred substantially simultaneously; and, if so,
   logic to perform a gesture operation at the computing device based on the simultaneous input from the first touch panel and the second touch panel, wherein first input and second input are each gestures that comprise:
   a first gesture at the first touch panel in a first direction and a second gesture at the second touch panel in the first direction;
   a first gesture at the first touch panel in a first direction and a second gesture at the second touch panel in a second direction opposite in relation to the first direction;
   a first gesture at the first touch panel comprising a touch and hold gesture and a second gesture at the second touch panel comprising a touch and hold gesture;

a first gesture at the first touch panel comprising a touch and hold gesture and a second gesture at the second touch panel in a first direction; or a first gesture at the first touch panel in a first direction and a second gesture at the second touch panel comprising a touch and hold gesture.

2. The system of claim 1, wherein the first touch panel is a capacitance touch panel and the second touch panel is a resistance touch panel.

3. The system of claim 1, wherein each of the first touch panel and the second touch panel is a capacitance touch panel.

4. The system of claim 1, wherein each gesture further comprises a plurality of gestures.

5. The system of claim 1, wherein the gesture operations comprise:
   spreading of objects appearing stacked on one another on a display of the computing device;
   stacking of objects appearing spread out on the display of the computing device;
   rotating of objects appearing on the display of the computing device from front to back;
   rotating through objects appearing on the display of the computing device in a sequence from one object to another object;
   manipulation of a three-dimensional object appearing on the display of the computing device; or
   selecting an object and moving the object to a different location.

6. The system of claim 1, wherein the first touch panel is disposed on a front of the computing device; and the second touch panel is disposed on a back side of the computing device.

7. A computing device, comprising logic at least partially comprising hardware to:
   check for a first input from a first touch panel;
   check for a second input from a second touch panel;
   determine if the first and second input occurred substantially simultaneously; and, if so
   perform a gesture operation at the computing device based on the simultaneous input from the first touch panel and the second touch panel, wherein the gesture operations comprise:
      spreading of objects appearing stacked on one another on a display of the computing device;
      stacking of objects appearing spread out on the display of the computing device;
      rotating of objects appearing on the display of the computing device from front to back;
      rotating through objects appearing on the display of the computing device in a sequence from one object to another object;
      manipulation of a three-dimensional object appearing on the display of the computing device; or
      selecting an object and moving the object to a different location.

8. The computing device of claim 7, wherein the first touch panel is a capacitance touch panel and the second touch panel is a resistance touch panel.

9. The computing device of claim 7, wherein each of the first touch panel and the second touch panel is a capacitance touch panel.

10. The computing device of claim 7, wherein the first and second inputs comprise gestures of a user.

11. The computing device of claim 9, wherein each gesture further comprises a plurality of gestures.

12. The computing device of claim 9, wherein the gestures comprise:
   a first gesture at the first touch panel in a first direction and a second gesture at the second touch panel in the first direction;
   a first gesture at the first touch panel in a first direction and a second gesture at the second touch panel in a second direction opposite in relation to the first direction;
   a first gesture at the first touch panel comprising a touch and hold gesture and a second gesture at the second touch panel comprising a touch and hold gesture;
   a first gesture at the first touch panel comprising a touch and hold gesture and a second gesture at the second touch panel in a first direction; or
   a first gesture at the first touch panel in a first direction and a second gesture at the second touch panel comprising a touch and hold gesture.

13. The computing device of claim 7, wherein the first touch panel and the second touch panel are each disposed on sides of the computing device opposite to one another.

14. The computing device of claim 7, wherein the first touch panel is disposed on a front of the computing device and the second touch panel is disposed on a back side of the computing device.

15. A non-transitory computer-readable medium, having instructions thereon to cause a computing device to perform operations, the operations comprising:
   checking for a first input from a first touch panel of a computing device;
   checking for a second input from a second touch panel of the computing device; wherein the first and second inputs are related to a gesture;
   determining if the first and second input occurred substantially simultaneously; and, if so,
   performing a gesture operation at the computing device based on the simultaneous input from the first touch panel and the second touch panel, wherein the gesture operation comprises:
      spreading of objects appearing stacked on one another on a display of the computing device;
      stacking of objects appearing spread out on the display of the computing device;
      rotating of objects appearing on the display of the computing device from front to back;
      rotating through objects appearing on the display of the computing device in a sequence from one object to another object;
      manipulation of a three-dimensional object appearing on the display of the computing device; or
      selecting an object and moving the object to a different location.

16. The non-transitory computer-readable medium of claim 15, wherein the first touch panel is a capacitance touch panel and the second touch panel is a resistance touch panel.

17. The non-transitory computer-readable medium of claim 15, wherein each of the first touch panel and the second touch panel is a capacitance touch panel.

18. The non-transitory computer-readable medium of claim 15, wherein the first and second inputs comprise gestures of a user.

19. The non-transitory computer-readable medium of claim 16, wherein each gesture further comprises a plurality of gestures.

20. The non-transitory computer-readable medium of claim 16, wherein the gestures comprise:

a first gesture at the first touch panel in a first direction and a second gesture at the second touch panel in the first direction;

a first gesture at the first touch panel in a first direction and a second gesture at the second touch panel in a second direction opposite in relation to the first direction;

a first gesture at the first touch panel comprising a touch and hold gesture and a second gesture at the second touch panel comprising a touch and hold gesture;

a first gesture at the first touch panel comprising a touch and hold gesture and a second gesture at the second touch panel in a first direction; or a first gesture at the first touch panel in a first direction and a second gesture at the second touch panel comprising a touch and hold gesture.

21. The non-transitory computer-readable medium of claim 15, wherein the first touch panel and the second touch panel are located on sides of the computing device opposite to one another.

22. The non-transitory computer-readable medium of claim 15, wherein the first touch panel is disposed on a front of the computing device; and the second touch panel is disposed on a back side of the computing device.

\* \* \* \* \*